(12) United States Patent
Churnick

(10) Patent No.: US 7,528,985 B2
(45) Date of Patent: May 5, 2009

(54) METHOD OF IMAGE CROPPING AND LOCATION AFFIXING FOR ENHANCED DUPLICATION REPRODUCTIONS ON EDIBLE MEDIA

(76) Inventor: Lewis Churnick, 21029 NE. Hwy 27, Williston, FL (US) 32696

(*) Notice: Subject to any disclaimer, the term of this patent is extended or adjusted under 35 U.S.C. 154(b) by 737 days.

(21) Appl. No.: 11/063,874

(22) Filed: Feb. 24, 2005

(65) Prior Publication Data

US 2005/0271782 A1    Dec. 8, 2005

Related U.S. Application Data

(60) Provisional application No. 60/576,456, filed on Jun. 3, 2004.

(51) Int. Cl.
*H04N 1/40* (2006.01)
(52) U.S. Cl. .................... 358/1.18; 358/500
(58) Field of Classification Search .......... 358/1.9, 358/2.1, 1.18, 537, 468, 1.2, 1.6, 500, 505
See application file for complete search history.

(56) References Cited

U.S. PATENT DOCUMENTS

| | | | | |
|---|---|---|---|---|
| 4,910,661 A | * | 3/1990 | Barth et al. | 700/66 |
| 5,017,394 A | * | 5/1991 | Macpherson et al. | 426/302 |
| 6,030,134 A | * | 2/2000 | Stewart | 400/600.2 |
| 6,147,743 A | * | 11/2000 | Fredlund et al. | 355/29 |
| 6,299,374 B1 | * | 10/2001 | Naor et al. | 401/198 |
| 6,582,742 B2 | * | 6/2003 | Stewart | 426/383 |
| 7,286,258 B2 | * | 10/2007 | Schnoebelen et al. | 358/1.18 |

* cited by examiner

*Primary Examiner*—Thomas D Lee
*Assistant Examiner*—Stephen M Brinich

(57) ABSTRACT

This method utilizes a template as a tool for cropping an image and locating it at specific coordinates on a copier or other image reproduction device using edible ink, utilizing the device's enlargement feature to size & place the reproduction printout at a precise position on the output page. It is also used in conjunction with the device's tile printing or "image repeat" feature to reproduce multiples of the original image with precise size & placement of the multiple output reproductions on edible media for use in decorating foodstuffs.

19 Claims, 4 Drawing Sheets

Figure 1:
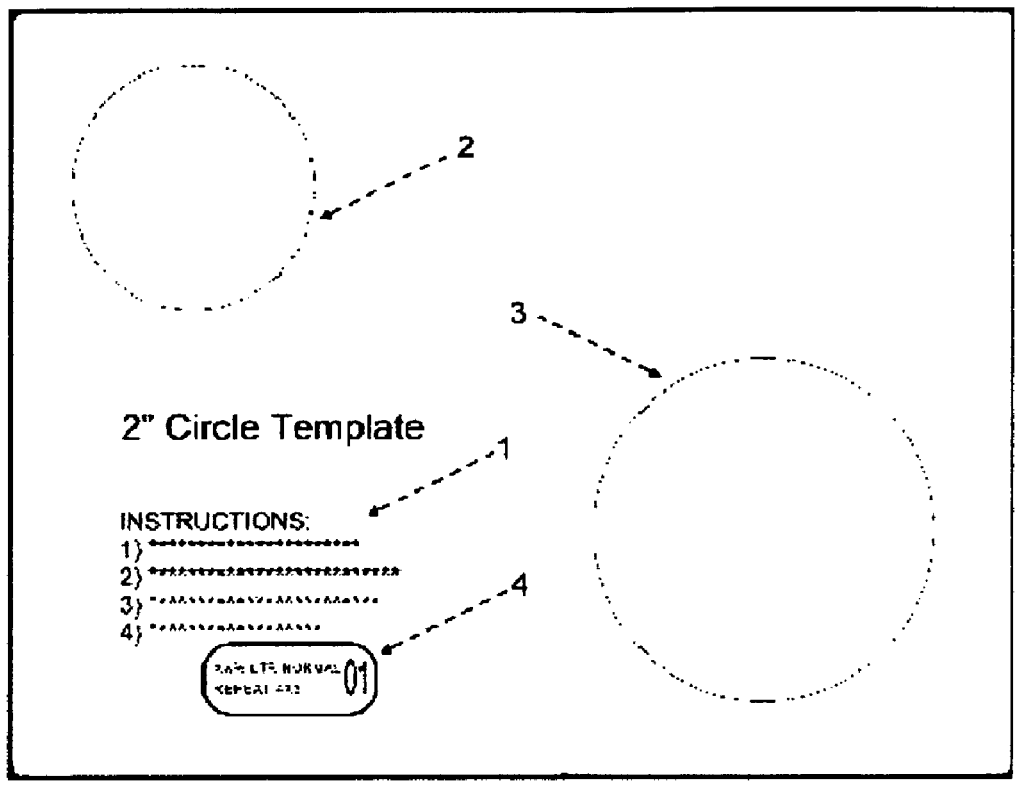

METHOD OF IMAGE CROPPING AND LOCATION AFFIXING FOR ENHANCED DUPLICATION REPRODUCTIONS ON EDIBLE MEDIA

CROSS REFERENCE TO RELATED APPLICATIONS

This application is a Continuation of a previously filed Provisional Application having Ser. No. 60/576,456 filed Jun. 3, 2004.

STATEMENT REGARDING FED SPONSORED R & D (none)

BACKGROUND OF THE INVENTION

The inventive method will allow precision control of size, position and multiples in the reproduction of images onto pre-designed edible media shapes. The edible items or media can be made in a variety of pre-formed shapes or sizes thus eliminating the need for cutting either before or after the adornment is applied. Said edible media may then be readily applied to foodstuffs.

Previous to this method in order to achieve multiple reproductions of an image it was necessary to repeat the steps of a copying process or utilize a computer program with tile printing capability. Repetitive copying wasted considerable time and material while computer operation required specialized skills. The duplicated images would then need to be cut from the edible media by hand or by die cut.

By this method the user need only follow a prescribed set of instruction steps applying the photo or image over the template, placing both together on the glass platen and tile-copying the cropped image directly onto pre-made Edible Media shapes.

Thus, with nominal prior training the user can quickly produce multiples and/or specialized shape image reproductions on edible media, without the need of computer skill, ready to be applied to foodstuffs.

SUMMARY OF INVENTION

The invention utilizes specialized copying functions of multifunction inkjet scan/print/copy stations now commonly available for color photo reproduction. Certain models, for this example The Multipass MP700 by Canon, are compatible with edible inks and commonly available.

The edible media are previously known (reference patent application Ser. No. 11/019,997) and can be made in a variety of preformed shapes or sizes, multiple count per backing by virtue of manipulation of patterns during the making, thus eliminating a need for cutting either before or after the adornment imagery is applied.

The instructions for using the template are as follows:
1) Select the masking template created for the desired output.
2) Line up the image to be reproduced with the cutout hole of the template, secure in place.
3) Place the template with attached image on the platen glass of a copier that uses edible ink.
4) Select output enlargement/reduction as indicated by instructions to determine the printed image size. These instruction settings are calculated based on the final pattern option desired and will differ with each pattern. Therefore the specific setting will be printed on the template surface.
5) Select Image Repeat settings as indicated by instructions to determine number of columns and number of rows. These instruction settings are calculated based on the final pattern option desired and will differ with each pattern. Therefore the specific settings will be printed on the template surface.
6) Insert corresponding style Edible Media in copier input feed tray.
7) Select "color copy" to activate machine copy process.

The Enlargement and Image Repeat option settings of the machine predetermine the area to be scanned for reproduction. The cutout hole of the template is positioned precisely on the X and Y axis to take advantage of these programmed settings, thus enhancing control of the size, shape, quantity and position of the output images. By using the corresponding style pre-made edible media shapes the output image will be located precisely where the edible media shapes are formed on the backing carrier.

ADVANTAGES

Economy: The copy station utilized is less expensive than a computer system

Efficiency: Set up time is greatly reduced by using a copy station instead of the process of inputting settings in a computer program. This time saving can translate directly to greater throughput and productivity.

Practicality: The instructions for use are printed directly on each template in a "Button-by-Button" format thereby requiring minimal training or computer skill on the part of the user. Verification is done by visual matching of the Settings Screen with a printed representation on the template thereby further assuring success on the part of an unskilled user.

Profitability: With reduction in machine cost, reduction in time required and utilization by unskilled laborers the potentials for cost savings greatly enhances profitability. Also, larger quantity production may be addressed more practically, thereby opening opportunities for new revenue venues at more competitive pricing.

DISCUSSION OF THE PRIOR ART

A method of using edible ink for decorating foodstuff is known, for example, U.S. Pat. No. 2,013,651 to Spergeon shows a decorating system for edible items wherein the image source is derived from a library of stored items by the way of a scanner and then passed on to a printer. The size of the printed image is selected, but not predetermined.

U.S. Pat. No. 6,147,743 to Fredlund illustrates a method and apparatus for providing zoom and crop functions in a photographic print and copying station. A scanner is used for scanning an image to print. A mask is placed over the image for copying and by selecting a desired copy size the masked area is recognized. The masked area is separated from the image area. The image area is resized to the selected copy size and the resized image is then printed.

U.S. Pat. No. 4,910,661 to Barth et al teaches a method and apparatus for decorating cakes using a machine for applying flowable decorative material to cakes and other items. Live video images are displayed by a video camera on a monitor. The video image can be edited by text and other images. The displayed pattern or image is reproduced on the cake by using an X-Y table which is moving under liquid spray applicators.

U.S. Pat. No. 5,017,394 to Mac Pherson et al shows a method for making edible base pictorial images by using a silk screen that is first prepared with the desired image and is then silk screened onto foodstuffs, there is no mention of any sizing before or after the silk screening method.

U.S. Pat. No. 6,582,742 to Stewart teaches a method of photocopying an image onto an edible web sheet whereby an iced cake is decorated. The sheet is passed through a plain paper, color inkjet photocopy machine to reproduce the color image placed on the photocopy glass. Thereafter the image is scanned through the glass by passing the carrier and edible web along a non-tortuous path. The edible web is placed on an iced foodstuff. There is no mention of cropping or multiple image output.

DESCRIPTION OF DIAGRAMS

Figure 2:
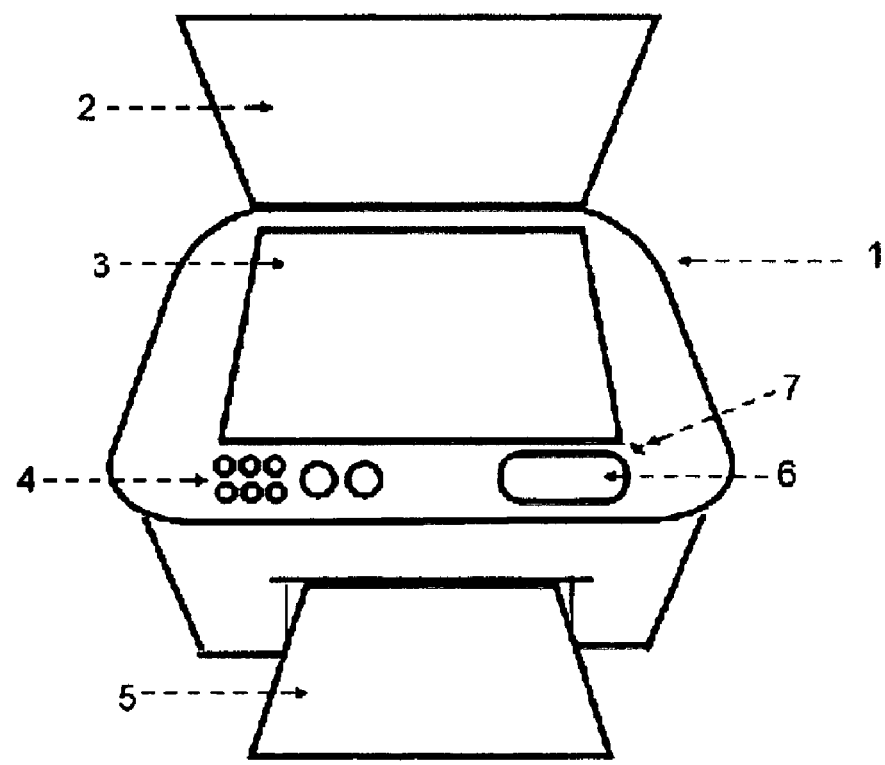
Figure 3:
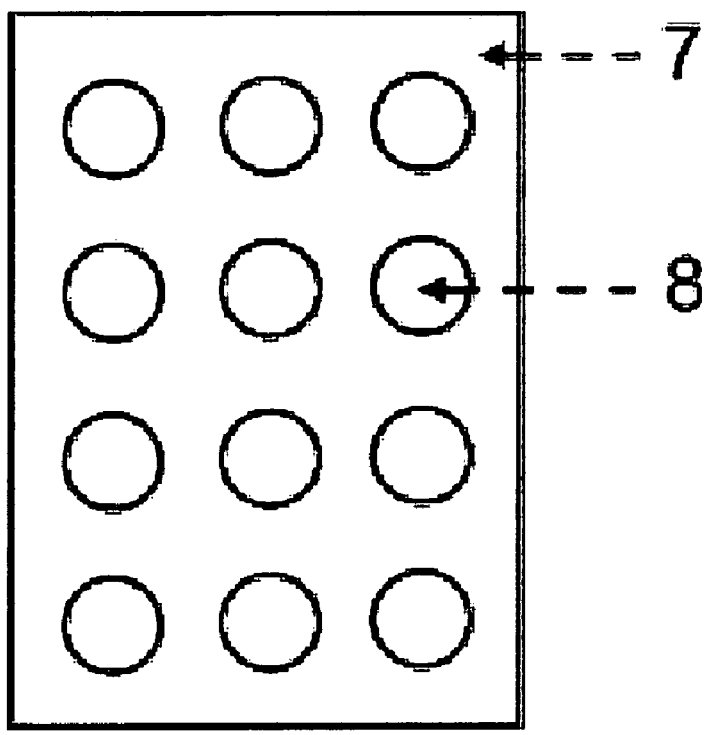
Figure 4:
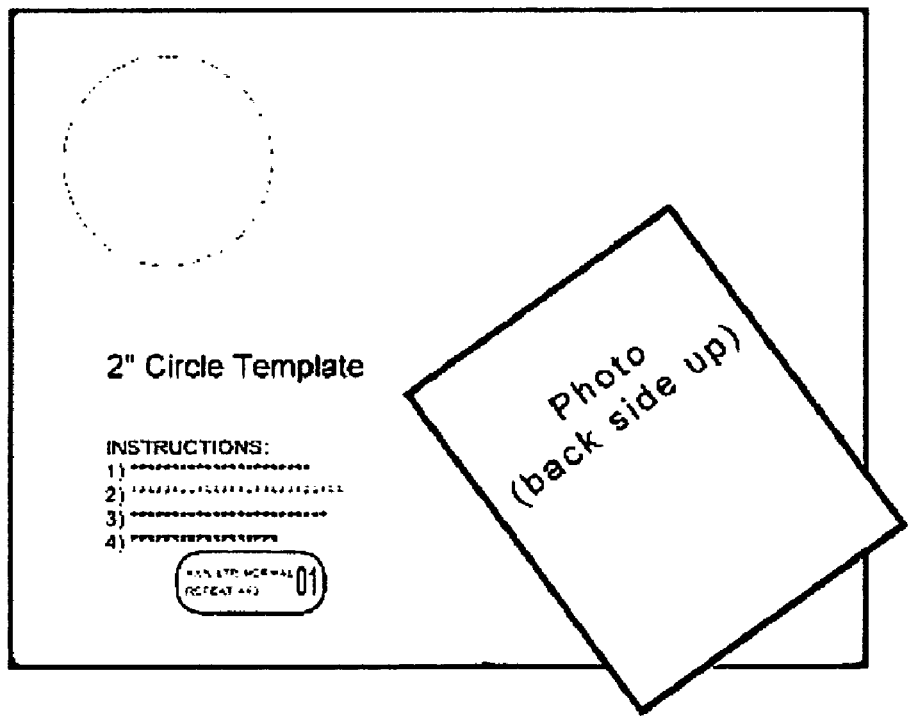

FIG. 1 shows a face view of the template.
1-1: Instructions
1-2: 2.5" cutout
1-3: 3.5" cutout
1-4: image of copier screen, predetermined settings FIG. 2 is a front perspective view of a typical image reproduction or copy station.
2-1: copier/reproduction device
2-2: cover
2-3: scan (platen) glass
2-4: control panel
2-5: output tray
2-6: copier screen
2-7: lead corner indicator FIG. 3 shows an example of edible media output page with special shape and multiples of edible media.
3-7: output page or backing
3-8: edible media shapes FIG. 4 showing the image or photo to be reproduced placed face down on the template with the desired area showing through the cutout.

Figure 5:
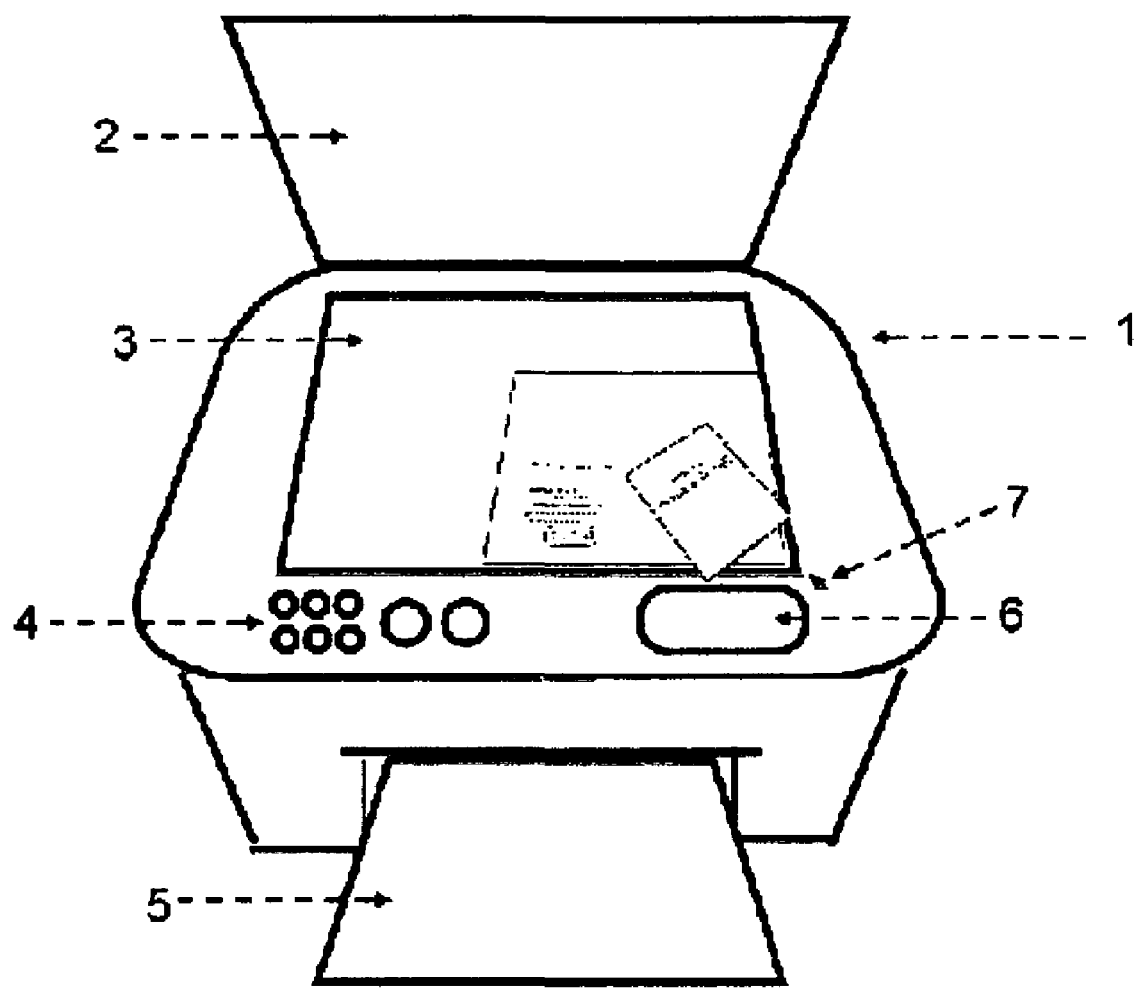
Figure 6:
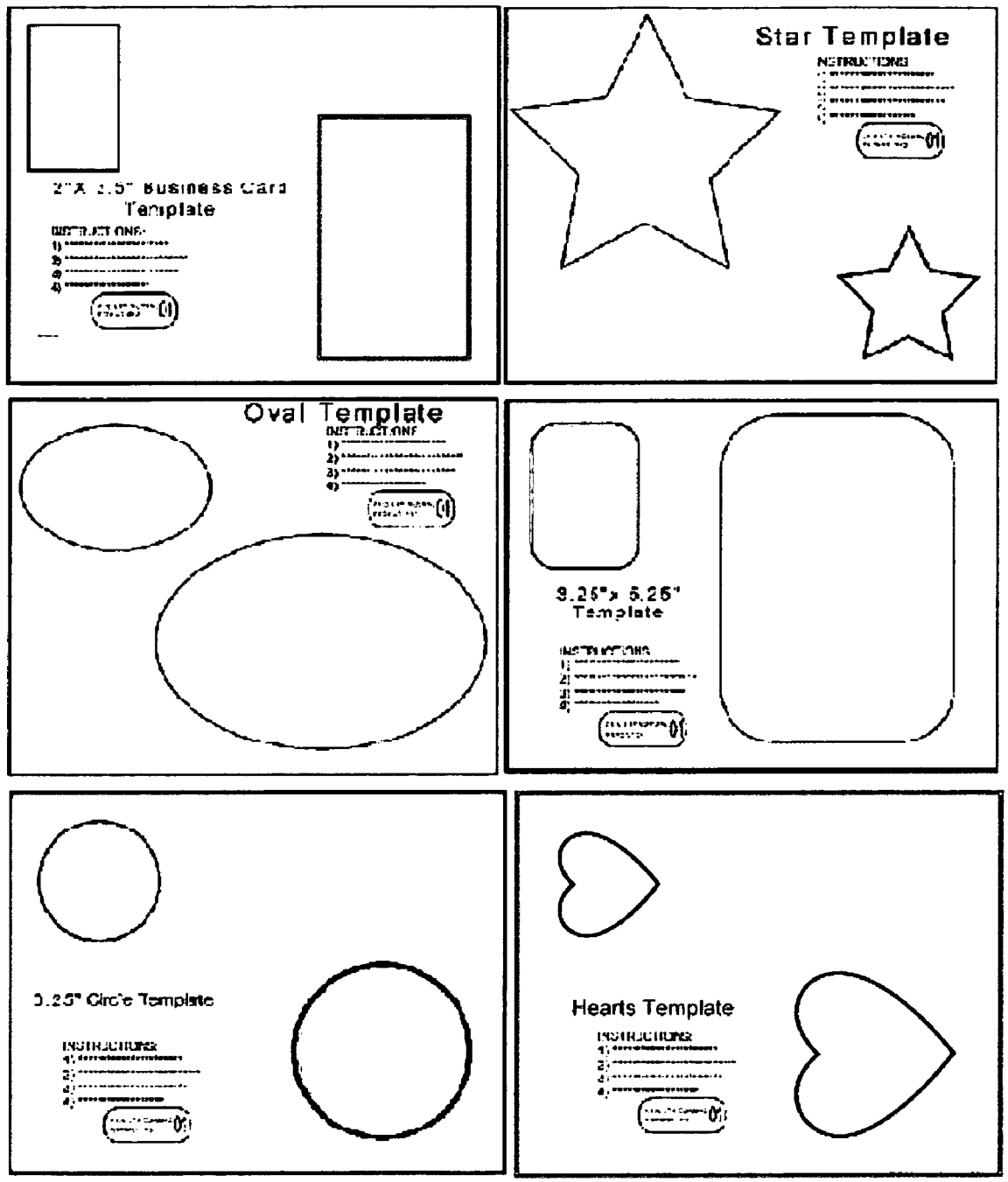

FIG. 5 showing the template with image secured is positioned in the lead corner of the reproduction device scan glass platen.
5-1: copier/reproduction device
5-2: cover
5-3: scan (platen) glass
5-4: control panel
5-5: output tray
5-6: copier screen
5-7: lead corner indicator FIG. 6 showing other examples of template configurations.

The invention claimed is:

1. A method of printing to edible media using a color reproducing device, comprising:
   placing a cropping tool at a predetermined location on a platen of the color reproducing device, the cropping tool defining a void;
   placing an original image to be reproduced on top of the void to crop a portion of the original image;
   activating a reproducing feature of the color reproducing device;
   receiving a reproduced image on the edible media, the reproduced image having a shape defined by a shape of the void; and
   activating a multiple image feature of the color reproducing device to create multiple, reproduced images on each sheet of edible media.

2. The method of claim 1, further comprising creating multiple, reproduced images on separate sheets of edible media.

3. The method of claim 1, further comprising activating a magnification feature of the color reproducing device to create the reproduced image at the magnification level.

4. The method of 3, further comprising locating the void at specific coordinates on the platen in accordance with a magnification level of the reproduced image relative to the original image.

5. The method of claim 4, further comprising defining the void in accordance with a size of the original image.

6. The method of claim 1, further comprising selecting the cropping tool in accordance with a predetermined output shape and size of the reproduced image.

7. The method of claim 6, wherein the predetermined shape consists of a rectangle, a star, an oval, a circle, a rectangle having rounded corners, or a heart-shape.

8. The method of claim 1, further comprising applying the edible media to foodstuffs.

9. A method of printing an edible reproduction of an image using a color copier, comprising:
   placing edible media in the color copier on which the edible reproduction of the image is to be printed;
   placing a cropping tool at a predetermined location on a platen of the color copier, the cropping tool defining a void having a size determined in accordance with a magnification level of the edible reproduction of the image;
   placing an original image to be reproduced on top of the void to crop a portion of the original image; and
   activating a control to print the edible reproduction of the image onto the edible media.

10. The method of claim 9, further comprising activating a multiple image feature of the color copier to create multiple, edible reproduction of the images on the same sheet of edible media.

11. The method of 9, further comprising locating the void at specific coordinates on the platen in accordance with the magnification level of the edible reproduction of the image relative to the original image.

12. The method of claim 11, further comprising defining the void in accordance with a size of the original image.

13. The method of claim 9, further comprising applying the edible media to foodstuffs.

14. A method of printing an image on edible media using a color ink-jet printer, comprising:
   placing a cropping tool at a predetermined location on a platen of the color ink-jet printer, the cropping tool defining a void having a predetermined shape and size determined in accordance with a magnification level and shape of an image to be printed;
   placing an original image to be reproduced on top of the void to crop a portion of the original image; and activating a control to print the image on onto the edible media, the image having a predetermined magnification level relative to the original image and a shape defined by the void.

15. The method of claim 14, further comprising activating a multiple image feature of the color ink-jet printer to create multiple images on the same sheet of edible media in accordance with a received selection.

16. The method of 14, further comprising locating the void at specific coordinates on the platen in accordance with the magnification level.

17. The method of claim 14, further comprising applying the edible media to foodstuffs.

18. The method of 17, further comprising determining the magnification level in accordance with a size of the foodstuffs to which the edible media is applied.

19. The method of claim 14, wherein the predetermined shape consists of a rectangle, a star, an oval, a circle, a rectangle having rounded corners, or a heart-shape.

\* \* \* \* \*